A. S. MARKHAM.
Wheel-Cultivator.

No. 39,412.

Patented Aug. 4. 1863.

UNITED STATES PATENT OFFICE.

A. S. MARKHAM, OF MONMOUTH, ILLINOIS.

IMPROVEMENT IN CULTIVATORS.

Specification forming part of Letters Patent No. 39,412, dated August 4, 186'.

*To all whom it may concern:*

Be it known that I, A. S. MARKHAM, of Monmouth, in the county of Warren and State of Illinois, have invented a new and Improved Cultivator; and I do hereby declare that the following is a full, clear, and exact description of the same, reference being had to the accompanying drawings, making a part of this specification, in which—

Figure 1:
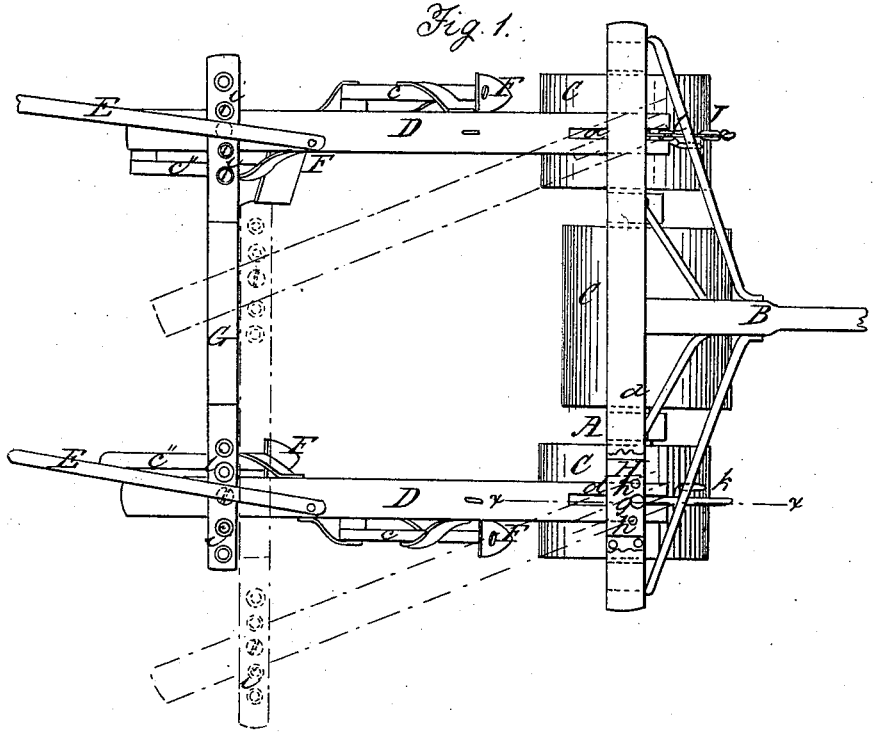
Figure 2:
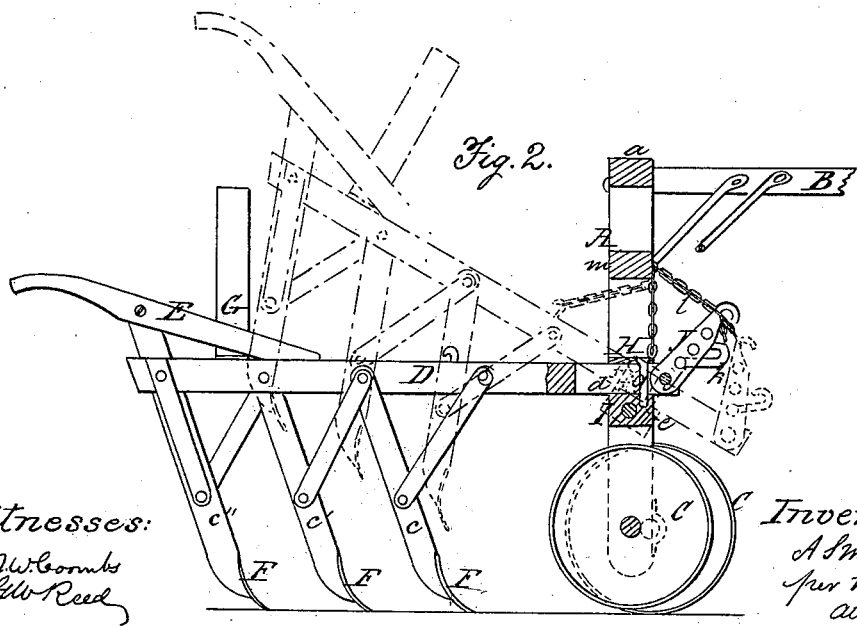

Figure 1 is a plan or top view of my invention; Fig. 2, a side sectional view of the same, taken in the line $x$ $x$, Fig. 1.

Similar letters of reference indicate corresponding parts in the two figures.

The object of this invention is to obtain a cultivator which will crush the clods of earth and pulverize the same as the machine is drawn along, so as to admit of the plows operating in a thorough and efficient manner, the parts being so arranged that the plows will be under the complete control of the operator or driver, and made to conform to the sinuosities of the rows of plants, so that none of the latter may be plowed out of the earth, the machine at the same time being capable of use as a harrow or for plowing in seed, and operating far more efficiently for that purpose than an ordinary harrow.

To enable those skilled in the art to fully understand and construct my invention, I will proceed to describe it.

A represents an upright frame, to the center of the cross-piece $a$ of which the draft-pole B is attached, and C C C are three rollers placed on separate or independent axles $b$ in the lower part of the frame A. These rollers C may be nearly or quite in line with each other. In the drawings the center roller is represented as being a trifle in advance of the other two.

D D represent two plow-beams, each of which has a handle, E, attached to its back end, and each has three inclined plow-standards, $c$ $c'$ $c''$, attached. The front standard, $c$, being attached to the outer side of the beams, the standards $c'$ attached in line with the beams, and the standards $c''$ attached to their inner sides. Each standard has a plow, F, secured to its lower end, of any proper size and form. The back parts of the two beams are connected by a cross-bar, G, which is bent upward at its center, so as to be sufficiently elevated to clear the growing plants. The front ends of the two plow-beams D D are slotted longitudinally, as shown at $d$ $d$, and said slotted ends pass through caps H, which are attached to the upper surfaces of bars I, which work loosely on horizontal shafts $e$ in the frame A. These shafts $e$ may be fitted in any of a series of holes, $f$, made in the frame A, said holes being one over the other, so that the bars I may be adjusted higher or lower in the frame A, as may be desired. The beams D are secured on the bars I by means of pins or bolts $g$, which pass through any of a series of holes, $h$, in the caps H, and through the slots $d$ into the bars I. By means of these series of holes $h$, and a similar series of holes, $i$, made in the bar G, the plow-beams may be adjusted at a greater or less distance apart, as may be desired.

In the front end of each plow-beam D there is secured, by a bolt, $j$, a draft-bar, J, in which hooks $k$ are fitted, to which the whiffletrees are attached, and the upper ends of the bars J are connected by chains $l$ to cross-bars $m$ in the frame A. These chains are designed to be so arranged as to admit of being "taken up" or "let out" to admit of the longitudinal adjustment of the plow-beams, as may be required. The draft-bars J may also be adjusted higher or lower in the front ends of the beams D D, or the hooks $k$ may be adjusted higher or lower in the bars J to regulate the draft, as may be desired.

From the above description it will be seen that each horse is attached to a plow-beam, and consequently each horse will have an equal share of work to perform. The plows, in consequence of the beams being attached to the frame A, as shown and described, may be raised and lowered, and also moved laterally, so as to be under the complete control of the operator or driver, who may make, with the greatest facility, the plows conform to the sinuosities of the rows of plants. The rollers C will crush the clods of earth and pulverize the same, so that the plows will have loose friable earth to operate upon, and the plants will not be liable to be injured by having lumps of earth cast upon them by the plows, as is frequently the case with ordinary cultivators. The depth of the penetration of the plows into the earth may be regulated by adjusting the bars I higher or lower in the frame A, and the rollers C, it will be seen, besides the clod-crushing friction they perform, and previously alluded to, serve to relieve the necks of the team of all weight of the machine.

I would remark that when necessary or desired the central roller C may be removed. This may be done during the second plowing of crops. During the first plowing all the rollers are necessary, and I would further remark that it is designed to have the chains *l* sufficiently long, that they may extend beyond the point of connection with the bars *m*, and serve, by connecting them to the beams, to hold up the beams D, as shown in red outline in Fig. 2. This is necessary when the machine is being drawn from place to place.

Having thus described my invention, what I claim as new, and desire to secure by Letters Patent, is—

1. The frame A, having the draft-pole B attached to it, in connection with the rollers C, fitted in the lower part of said frame A, and the plow-beams D, attached to the frame A, and connected at their back parts by the bar G, substantially as and for the purpose specified.

2. The particular manner of connecting the plow-beams D to the frame A, to wit: by having the front ends of the beams slotted longitudinally, with pins or bolts *g* passing through the slots into bars I, which are fitted loosely on shafts *e*, substantially as and for the purpose set forth.

3. The draft-bars J, attached to the front ends of the plow-beams D by bolts *j*, and connected at their upper ends to the frame A by chains *l*, and having hooks *k* secured to them, all arranged as shown, whereby the draft may be regulated and the beams D adjusted longitudinally, as may be required.

A. S. MARKHAM.

Witnesses:
O. P. REESE,
DANIEL MARKHAM.